US009042377B2

(12) United States Patent
Redmon et al.

(10) Patent No.: US 9,042,377 B2
(45) Date of Patent: May 26, 2015

(54) SYSTEM AND METHOD FOR WEB TELEPHONE SERVICES

(71) Applicant: Speak2sales, LLC, Duncanville, TX (US)

(72) Inventors: Clayton K. Redmon, Dallas, TX (US); Bryan W. Nations, McKinney, TX (US)

( * ) Notice: Subject to any disclaimer, the term of this patent is extended or adjusted under 35 U.S.C. 154(b) by 108 days.

(21) Appl. No.: 13/899,721

(22) Filed: May 22, 2013

(65) Prior Publication Data

US 2014/0348157 A1    Nov. 27, 2014

(51) Int. Cl.
*H04L 29/06* (2006.01)
*G06F 15/16* (2006.01)
*G06F 17/22* (2006.01)

(52) U.S. Cl.
CPC ...... *H04L 29/06027* (2013.01); *G06F 17/2247* (2013.01); *G06F 17/22* (2013.01)

(58) Field of Classification Search
CPC .............. H04L 29/06027; G06F 17/22; G06F 17/2247
USPC .......................................................... 370/352
See application file for complete search history.

(56) References Cited

U.S. PATENT DOCUMENTS

| 6,760,429 | B1 * | 7/2004 | Hung et al. ............... 379/265.09 |
| 8,875,268 | B2 * | 10/2014 | Swerdlow et al. ................. 726/7 |
| 2007/0143397 | A1 * | 6/2007 | Guedalia et al. .............. 709/203 |
| 2009/0213844 | A1 * | 8/2009 | Hughston ...................... 370/352 |
| 2010/0287301 | A1 | 11/2010 | Kalmstrom |
| 2012/0166289 | A1 * | 6/2012 | Gadoury et al. ........... 705/14.66 |
| 2013/0124641 | A1 * | 5/2013 | Ryabchun et al. ............ 709/206 |
| 2013/0266004 | A1 * | 10/2013 | Nunez Sanz .................. 370/354 |
| 2014/0136949 | A1 * | 5/2014 | Wang ............................ 715/234 |

OTHER PUBLICATIONS

Parmar et al., Adobe's Real Time Messaging Protocol, Adobe, Dec. 2012, RTMP Specification 1.0.*
Make Phone Calls from Your Browser, Kyle Pott, Author; http://www.lifehack.org/articles/communication/make-phone-calls-from-your-browser.html.

* cited by examiner

*Primary Examiner* — Chi H Pham
*Assistant Examiner* — Shailendra Kumar
(74) *Attorney, Agent, or Firm* — Andrews Kurth LLP

(57) ABSTRACT

A web telephone service system comprises a client web page adapted to be displayed on a screen of a computer, the client web page including an element associated with the web telephone service and embedded software code, a client web server hosting the web page and an authentication key, an application server adapted to authenticate the client using the authentication key and determining a client telephone number associated with the client, a media server adapted to translate IP traffic to and from a real-time protocol traffic, a media gateway in communication with a private branch exchange adapted to associate the client telephone number with a dial plan, a SIP trunk adapted to translate VOIP traffic to and from POTS traffic, and whereby a user clicking on the visual element is operable to cause a voice communication line to be automatically established between the computer and a client POTS telephone device.

14 Claims, 2 Drawing Sheets

SYSTEM AND METHOD FOR WEB TELEPHONE SERVICES

FIELD

The present disclosure relates the field of communications, and more particularly to a system and method for web telephone services.

BACKGROUND

In the 21st century, the Internet and the World Wide Web have become an increasingly important component of all types of communications. Internet penetration in North America is over 78%, and the there are over 2.4 billion Internet users worldwide. In other words, a third of the world's population are Internet users. People are spending more and more time online, surfing the web, watching videos, uploading photographs, looking up information, and socializing on social networking sites. Along with the availability of web-enabled devices like the mobile telephone, tablet computers, laptop computers, and desktop computers, the Internet is more accessible than ever before.

Current "click-to-talk" capabilities of Internet websites require a user to enter a telephone number so that a telephone can be placed to call the user. These services are more accurately characterized as request-to-call, since the website operator must use the supplied telephone number to call the user. These conventional services are disadvantageous because many users are extremely reluctant to supply their telephone numbers for fear of future uninvited sales calls and the possibility that their information would be sold to unscrupulous telemarketing companies. Despite this problem, studies have shown that websites that implement request-to-call greatly improve website conversion rates and see an average of 143% return on the investment (ROI).

SUMMARY

A web telephone service system comprises a client web server in communication with the Internet and hosting an authentication key and at least one web page having embedded software code, a web telephone application server in communication with the Internet having a database storing a client telephone number, a media server in communication with the web telephone application server and adapted to transmit IP traffic according to a real-time protocol, a media gateway in communication with the media server and a client private branch exchange adapted to associate the client telephone number with a predetermined dial plan, a Session Initiation Protocol trunk adapted to translate VOIP traffic to and from POTS traffic, and whereby a user initiating the web telephone service is operable to trigger the execution of the embedded software code and cause a communication line to be established between the computer of the user displaying the at least one web page via the web server and a client POTS telephone device associated with the dial plan.

A web telephone service system comprises a client web server in communication with the Internet and hosting an authentication key and at least one web page having embedded software code, a web telephone application server in communication with the Internet having a database storing a client telephone number, a media server in communication with the web telephone application server and adapted to transmit IP traffic according to a real-time protocol, a media gateway in communication with the media server and a client private branch exchange adapted to associate the client telephone number with a predetermined dial plan, a Session Initiation Protocol trunk adapted to translate VOIP traffic to and from POTS traffic, and whereby a user initiating the web telephone service is operable to trigger the execution of the embedded software code and cause a communication line to be established between the computer of the user displaying the at least one web page via the web server and a client POTS telephone device associated with the dial plan.

A method for web telephone service comprises receiving a request for web telephone service and an authentication key, authenticating the authentication key and identifying a client associated with the received authentication key, determining a client telephone number associated with the client, and transmitting the client telephone number to a client private branch exchange that associates the client telephone number with a predetermined dial plan and enables a communication line to be established with a POTS telephone device associated with the dial plan.

DETAILED DESCRIPTION

Figure 1:
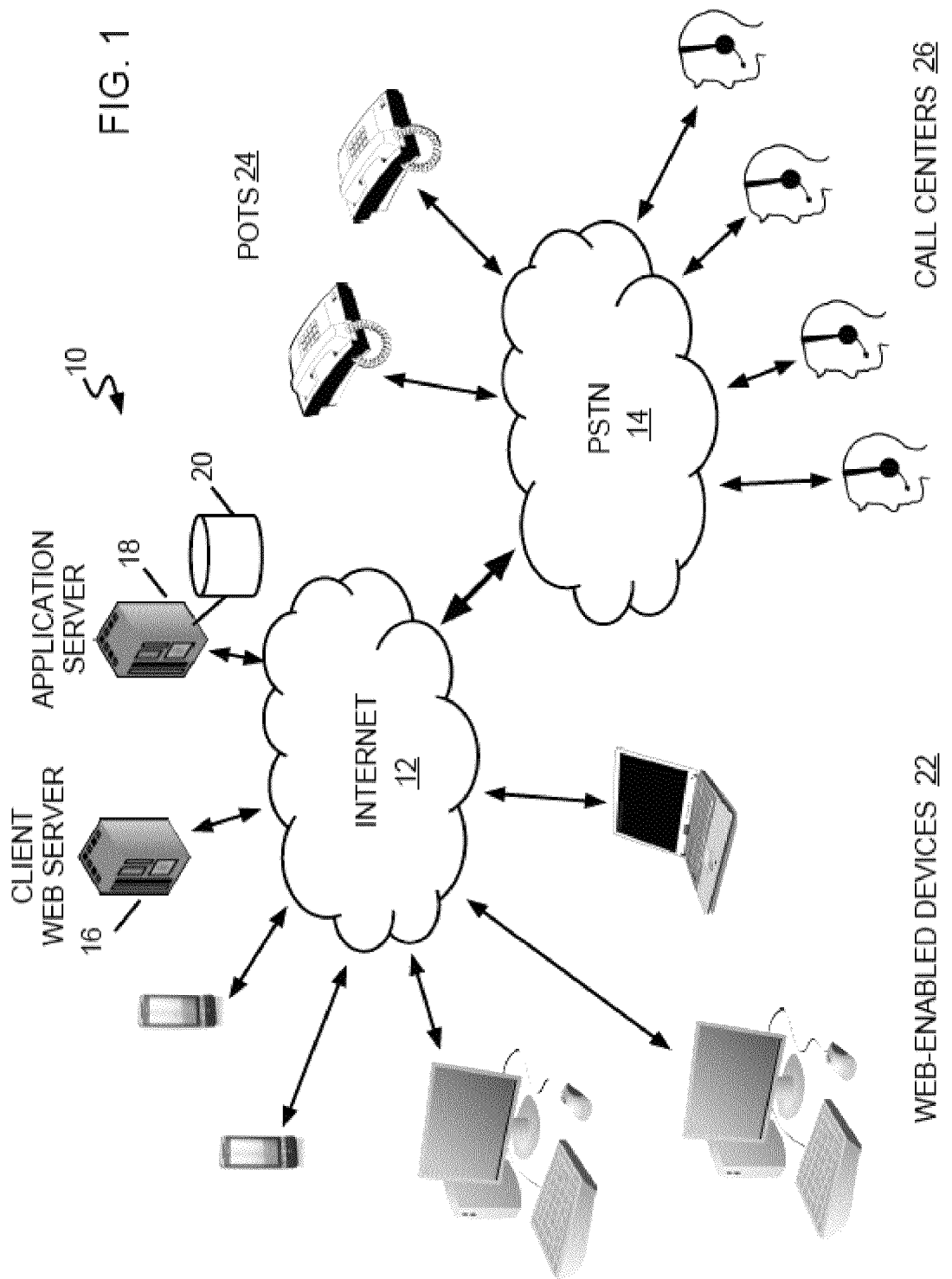
FIG. 1 is a simplified block diagram illustrating a web telephone service system according an exemplary embodiment of the present disclosure.

FIG. 1 is a simplified block diagram illustrating a web telephone service system 10 according an exemplary embodiment of the present disclosure. The web telephone service system 10 spans the Internet or World Wide Web 12 and the Public Switched Telephone Network 14 (PSTN). The web telephone service system 10 includes embedded code and an authentication key stored on a client's web server 16, and an application server 18 that have access to client data in a database 20. A plurality of web-enabled computing devices 22, such as tablet computers, laptop computers, desktop computers, mobile telephones, and other devices to be developed in the future, may be used to initiate and access the web telephone service.

An exemplary application of the web telephone service system 10 is customer order, customer service, and tech support for a corporation or firm in a wide variety of industries. A user may use a web browser to navigate to a web page on a company's website. The web page may display a telephone number to order merchandize, for customer service, or for tech support. The user may simply click on the telephone number, a button, a graphic element, text, or some other visual element associated with a hypertext link that automatically triggers the web telephone service. The user's click on the telephone number causes a telephone call to be automatically routed and placed to a POTS (Plain Old Telephone Service) phone 24, or to a call center 26 associated with the PSTN 14, for example.

Figure 2:
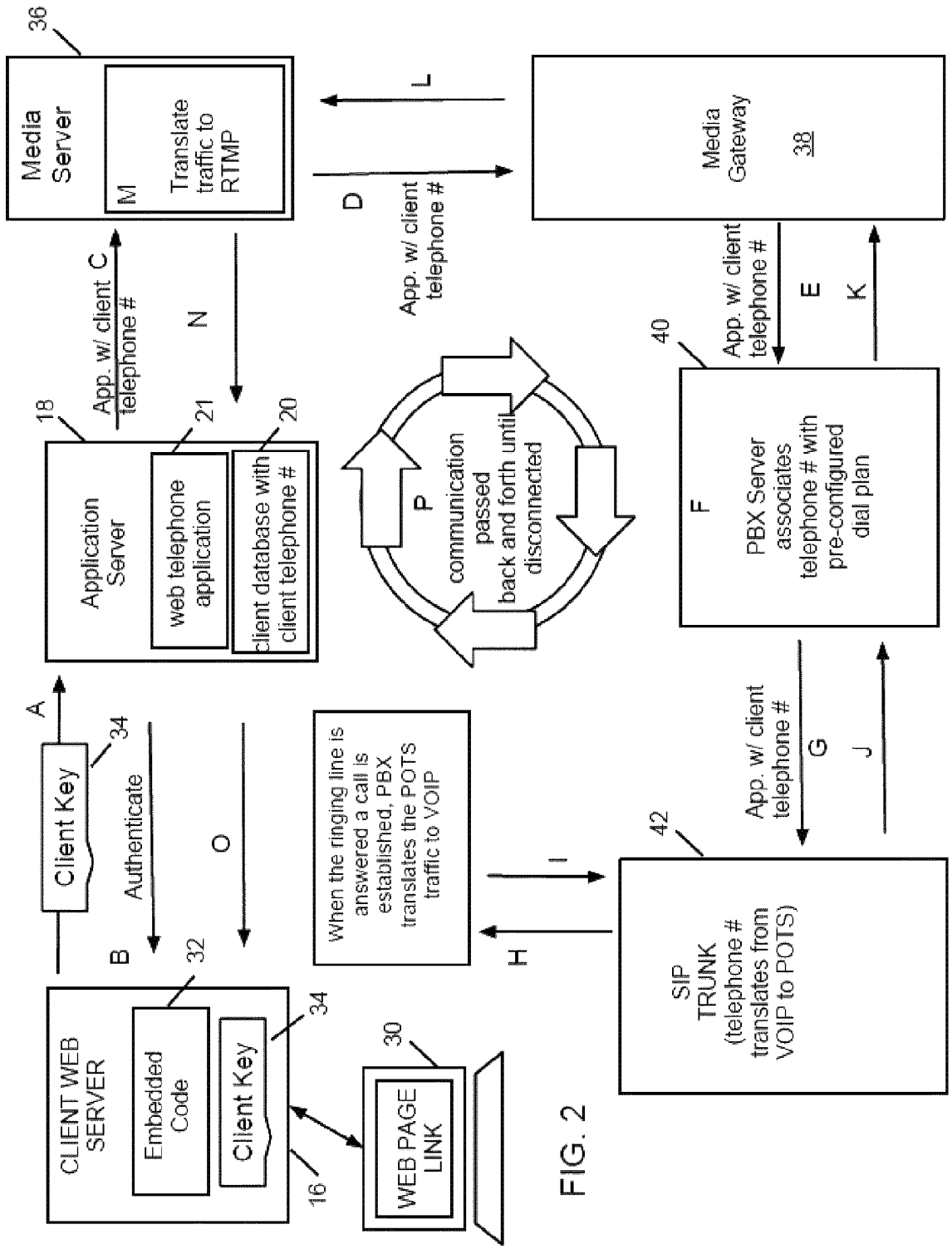
FIG. 2 a more detailed data flow diagram illustrating the web telephone service system and method.

FIG. 2 is a more detailed data flow block diagram illustrating the web telephone service system and method. A user browsing the World Wide Web may view a website belonging to a client subscribing or licensing the web telephone service includes at least one web page 30 with embedded code 32 that also displays a visual element associated or linked to the web telephone service. The web page may be displayed on a display screen or touch screen of a web-enabled computing device. The visual element is associated with a hypertext link or another form of link that is operable to trigger the execution of embedded software code 32, which may be in the form of a scripting language such as Java Script or another suitable language. The embedded software code 32 automatically causes an authentication key 34, also stored on the client's web server 16, to be transmitted to an application server 18 associated with the web telephone service (A). The authentication key 34 is associated with that particular client and can be used to identify the source of the service request. The application server 18 receives the authentication key 34 and accesses data stored in a client database 20 to authenticate the service request instance from the client web server 16. The result of authentication is transmitted from the application server 18 to the client's web server 16 (B). Further, a telephone number associated with that particular client is fetched from the database 20, and encapsulated with the web telephone service application software or code 21 and sent to a media server 36 (C). The web telephone service application software or code 21 contains the logic and/or information necessary to establish a communication line connection between the client web server and the client's call center, for example. The media server 36 relays this encapsulated application code and telephone number to a media gateway 38 (D), which further relays the encapsulated application code and telephone number to the client's PBX (Private Branch Exchange) server 40 (E).

The client's PBX server 40 has been pre-configured to associate the telephone number with a predetermined dial plan. The dial plan may include one or more additional telephone numbers, the number of maximum simultaneous channels or conversations, and/or other features (F). The PBX server 40 connects to a SIP trunk 42, which translates the communication line from VOIP (Voice Over Internet Protocol) to POTS (Plain Old Telephone System) (G), and rings a telephone device associated with the dial plan. When the ringing line is answered, a call is established, and the PBX server translates the POTS traffic to VOIP (H). The POTS connects back to the SIP trunk 42 (I). The SIP trunk 42 connects back to the PBX server 40 (J), the PBX server 40 connects back to the media gateway 38 (K), and the media gateway 38 connects back to the media server 36 (L), which encapsulates the voice call traffic using a real-time Internet-based protocol such as RTMP (real-time messaging protocol) or another suitable protocol (M). The media server 36 connects back to the application server 18 (N), and the application server 18 connects back to the client web server 16 (O). The communication line is automatically established via these components until the call is disconnected by either the web server or the POTS user (P).

The system components described herein and shown in FIG. 2 are exemplary and for the purpose of illustration only. Other implementations of the web telephone system and method are possible and contemplated herein. For example, the communication path may be established by one or more suitable telecommunication components other than the media server, media gateway, private branch exchange, and SIP trunk described herein. Further, the manner in which the web telephone service is triggered may be via a voice command, for example, instead of clicking on a link or visual element. In addition to a voice communication line being established via this system and method, a video conference communication line may be automatically established to enable video and audio data to be transmitted between the user's computer and the POTS telephone device.

The web telephone service system and method of the present disclosure enables a user to simply click on a telephone number, text, or a graphic element displayed on a website that automatically triggers a call to be made to one or more predetermined telephone numbers. The user is not required to enter a telephone number for the website company to call, or enter a telephone number to make the call. This solution thus overcomes the typical user's reluctance to provide any personal information such as his/her own telephone number to a company that he or she may not have any prior relationship or dealings. In addition, the user is not required to download any code or software application to his/her computer in order to make this call other than the web page and the embedded software code. This solution thus also overcomes the typical user's reluctance to download software out of concern of introducing malicious code into the computer.

The features of the present invention which are believed to be novel are set forth below with particularity in the appended claims. However, modifications, variations, and changes to the exemplary embodiments described above will be apparent to those skilled in the art, and the control system and method described herein thus encompass such modifications, variations, and changes and are not limited to the specific embodiments described herein.

What is claimed is:

1. A web telephone service system, comprising:
   a client web page adapted to be displayed on a display screen of a computing device, the web page including a visual element associated with the web telephone service, the visual element having embedded software code associated therewith;
   a client web server in communication with the Internet and hosting the client web page and an authentication key;
   a web telephone application server in communication with the Internet having a database storing a client telephone number, the web telephone application server adapted to authenticate the client using the authentication key and determining a client telephone number in response to authenticating the client;
   a media server in communication with the web telephone application server and adapted to translate IP traffic to and from Real-Time Messaging Protocol traffic;
   a media gateway in communication with the media server and a client private branch exchange adapted to associate the client telephone number with a predetermined dial plan;
   a Session Initiation Protocol trunk adapted to translate VOIP traffic to and from POTS traffic; and
   whereby a user clicking on the visual element is operable to cause a voice communication line to be automatically established between the computing device and a client POTS telephone device associated with the dial plan via the web server.

2. The web telephone service system of claim 1, wherein the web telephone application server further comprises a web telephone service application, the web telephone application server being adapted to encapsulate the web telephone service application and the client telephone number for transmission to the media server.

3. The web telephone service system of claim 1, wherein the computing device is selected from the group consisting of a tablet computer, laptop computer, desktop computer, and mobile telephone.

4. A web telephone service system, comprising:
   a client web server in communication with a computing device and hosting an authentication key and at least one web page having embedded software code;
   a web telephone application server in communication with the Internet having a database storing a client telephone number corresponding to the authentication key, the web telephone application server is operable to encapsulate a web telephone service application with the client telephone number in response to the authentication key being authenticated, and transmitting the encapsulated application and client telephone number, the web telephone application server operable to communicate with at least one network component adapted to transmit IP traffic according to a real-time protocol, adapted to associate the client telephone number with a predetermined dial plan, and adapted to translate VOIP traffic to and from POTS traffic; and whereby a user viewing the web page on the computing device initiates the web telephone service by triggering the execution of the embedded software code and causing the encapsulated application and client telephone number to be transmitted to the at least one network component, and causing a communication line to be automatically established between the computing device via the web server and a client POTS telephone device associated with the dial plan.

5. The web telephone service system of claim 4, wherein the web telephone application server is operable to encapsulate a web telephone service application with the client telephone number associated with the predetermined dial plan encompassing a plurality of additional client telephone numbers and a maximum number of simultaneous conversation channels.

6. A method for web telephone service, comprising:
receiving a request for web telephone service and an authentication key;
authenticating the authentication key and identifying a client associated with the received authentication key;
determining a client telephone number associated with the client;
encapsulating the client telephone number and a web telephone application; and
transmitting the encapsulated web telephone application and client telephone number to a client private branch exchange that associates the client telephone number with a predetermined dial plan and enables a communication line to be automatically established with at least one telephone device associated with the dial plan.

7. A method for web telephone service, comprising:
displaying a representation of a link associated with the web telephone service on a computing device;
receiving a user click on the link requesting web telephone service;
automatically transmitting an authentication key associated with the web telephone service to an application server, which authenticates the authentication key and determines a client telephone number associated with the request;
encapsulating the client telephone number and a web telephone application and transmitting the encapsulated application and telephone number to a client private branch exchange; and
automatically establishing a voice connection with a telephone device via the client private branch exchange in accordance with a dial plan associated with the client telephone number.

8. The web telephone service system of claim 1, comprising a representation of a hypertext link associated with the web telephone service shown visually on the display screen of the computing device.

9. The web telephone service system of claim 1, wherein the media gateway is further configured to associate the client telephone number with a plurality of client telephone numbers encompassed by the predetermined dial plan.

10. The web telephone service system of claim 1, wherein the media gateway is further configured to associate the client telephone number with a maximum number of simultaneous conversation channels encompassed by the predetermined dial plan.

11. The method for web telephone service of claim 6, further comprising associating the client telephone number with the predetermined dial plan comprising a plurality of client telephone numbers and a maximum number of simultaneous conversation channels.

12. The method for web telephone service of claim 11, further comprising enabling a communication line to be automatically established with one of the plurality of client telephone numbers in accordance with the predetermined dial plan.

13. The method for web telephone service of claim 7, further comprising associating the client telephone number with the predetermined dial plan comprising a plurality of client telephone numbers and a maximum number of simultaneous conversation channels.

14. The method for web telephone service of claim 13, further comprising automatically establishing a voice connection with one of the plurality of client telephone numbers in accordance with the predetermined dial plan.

* * * * *